US007513692B2

(12) United States Patent
Bezyaiko (10) Patent No.: US 7,513,692 B2
(45) Date of Patent: Apr. 7, 2009

(54) METHOD FOR MULTI ORBITAL ENGAGEMENT OF SURFACES BY FREE ROLLING BODIES AND MULTI ORBITAL DEVICES BASED ON THIS METHOD

(76) Inventor: Natan Bezyaiko, 16 Baruch Karo Street, Jaffa (IL) 68203

( * ) Notice: Subject to any disclaimer, the term of this patent is extended or adjusted under 35 U.S.C. 154(b) by 300 days.

(21) Appl. No.: 10/560,118

(22) PCT Filed: May 3, 2005

(86) PCT No.: PCT/IL2005/000465

§ 371 (c)(1),
(2), (4) Date: Dec. 9, 2005

(87) PCT Pub. No.: WO2005/106265

PCT Pub. Date: Nov. 10, 2005

(65) Prior Publication Data

US 2006/0147142 A1    Jul. 6, 2006

Related U.S. Application Data

(60) Provisional application No. 60/567,444, filed on May 4, 2004.

(51) Int. Cl.
*F16C 19/20* (2006.01)
*F16H 13/08* (2006.01)
(52) U.S. Cl. ............................ 384/521; 74/25; 475/183; 476/70

(58) Field of Classification Search ................. 384/521, 384/522, 552, 553, 447; 476/36, 39, 67, 476/70; 74/25, 44, 63, 69; 475/183, 195, 475/331
See application file for complete search history.

(56) References Cited

U.S. PATENT DOCUMENTS

| | | | | |
|---|---|---|---|---|
| 449,837 | A * | 4/1891 | Thorp | 384/553 |
| 1,093,922 | A * | 4/1914 | Dieterich | 476/15 |
| 1,737,695 | A | 3/1929 | Zadow | |
| 1,956,934 | A * | 5/1934 | Stelzer | 476/61 |
| 1,985,645 | A * | 12/1934 | Rosner | 476/67 |
| 2,965,420 | A * | 12/1960 | Grieder | 384/552 |
| 3,254,546 | A * | 6/1966 | Nasvytis | 475/183 |
| 3,380,312 | A | 4/1968 | Barske | |
| 4,053,191 | A | 10/1977 | Traut | |
| 4,208,077 | A | 6/1980 | Roiz | |
| 4,326,759 | A | 4/1982 | Rasmus | |
| 7,018,316 | B2 * | 3/2006 | Ai | 475/183 |

* cited by examiner

*Primary Examiner*—Thomas R Hannon

(57) ABSTRACT

The present invention provides a new bearing device of free rolling parts. According to the basic embodiment the bearing device is comprised of: an inner race, an outer race, two rows of rolling parts wherein each rolling part is in not in a contact with two adjacent rolling parts in the same row and in contact with rolling parts of at least one adjacent row and/or with the surface of one of the races. The bearing structure is designed to create orbital eccentricity between the inner race and the outer race. When a load is applied on said bearing it is equally distributed over all rolling parts.

Furthermore, the load applied on said bearing decrease the orbital eccentricity wherein minimum limit of orbital eccentricity is maintained through the working process. The device engagement of rolling parts is slack-free.

10 Claims, 13 Drawing Sheets

METHOD FOR MULTI ORBITAL ENGAGEMENT OF SURFACES BY FREE ROLLING BODIES AND MULTI ORBITAL DEVICES BASED ON THIS METHOD

RELATED APPLICATIONS

This application is a National Phase Application of PCT Application No. PCT/IL2005/000465 having International Filing Date of May 3, 2005, which claims the benefit of U.S. Provisional Patent Application No. 60/567,444, filed on May 4, 2004. The contents of the above Applications are all incorporated herein by reference.

FIELD OF INVENTION

The invention discloses methods for reducing kinetic friction of moving, mainly rotating parts. The present invention also relates to tooth-free frictional differential reduction gears, roller bearings, extrusion pumps and other devices combining these.

BACKGROUND

Methods of reducing kinetic friction are known in the prior art. According to these methods, rolling parts are placed between moving closed surfaces. The rolling parts can be fixed or free. These types of methods are implemented in translational or rotational engagements.

The present patent mainly relates to a rotational engagement, but can also be extended to a translational type of engagement.

Roller bearings, which substitute kinetic friction with static one are widely used in this technology, improving performance of devices and reducing power losses.

The roller bearings consist of concentric inner and outer races with tracks on their surfaces. The space between the races is filled with rolling parts. The rolling parts roll on the tracks of the surfaces minimizing the kinetic friction.

The roller bearing known in the prior art contains one orbital row of rolling parts and a separator that provides spatial separation between the rolling parts and determines the relative distance between them. The motion of the roller bearing is effected by not only contacts of the rolling parts with tracks, but also by their slipping contacts with the separator.

There are number of attempts known in the prior art to avoid the use of a separator in order to improve the functionality of the system of this type. This can be done by reducing or removing the slippage of the system's parts as well as distributing the radial and frictional loads over all of the rolling parts and contact surfaces of the race tracks.

U.S. Pat. No. 4,208,077 discloses a bearing with a second orbital row of rollers which encircles the first row in such a way that each roller of the outer row is in contact with the outer race track and two rollers of the inner row, and each roller of the inner row is in contact with the inner race track and two rollers of the outer row. One of the rollers is concave and consists of two conical parts. These two conical parts are connected by an adjustable screw for varying their axial mutual position. The said composite roller is inserted to the roller bearing at the last stage of its assemblage. The change in the relative distance between the two parts of the composite roller should enable the precise fitting of races, balls and parts to maintain slack-free engagement.

U.S. Pat. No. 4,326,759 discloses a bearing with a third row of rollers positioned between the first and the second row. Each roller of the second row is in contact with two rollers of adjacent inner and outer rows. Constant engagement should be achieved due to the precision of the bearing parts, which provides the retention of the engagement and lengths of orbital rows ensuring concentricity of the races.

U.S. Pat. No. 4,053,191 presents a method for producing rolling-contact-only bearings with rotating elements and rings. The rings acting as springs should ensure continuous separation between all rotating elements, thereby carrying the entire bearing load and permitting radial deflection under load to avoid slippage of the elements. The retention of the engagement should provide concentricity of the races.

Methods for using two tracks and several rows of rollers between them as a frictional reduction gear are also known in the prior art.

One of these methods is disclosed in U.S. Pat. No. 1,737,695. The author suggests the use of inner and outer races as well as several rows of rolling parts in the method described above with two modifications:

for the adjustment of mutual retention between the parts a pressure roller is mounted between two adjacent rollers. The pressure roller is in contact with other two rollers that belong to a row and it is not connected to the races. The radial displacement of the pressure roller results in a change of mutual position of the two friction rollers and consequently effects on orbit lengths of all rows and retention of the engagement.

to ensure the concentricity the races, they are engaged by two additional bearings.

SUMMARY OF THE INVENTION

The present invention provide a new bearing device having free rolling parts, comprised of: an inner race, an outer race, at least two rows of rolling parts wherein each rolling part is in contact with two adjacent rolling parts in the same row and with rolling parts of at least one adjacent row and/or with the surface of one of the races, wherein the bearing structure is designed to create orbital eccentricity between the inner race and the outer race.

BRIEF DESCRIPTION OF THE DRAWINGS

These and further features and advantages of the invention will become more clearly understood in the light of the ensuing description of a preferred embodiment thereof, given by way of example only, with reference to the accompanying drawings, wherein—

FIGS. 1C and 2C are illustrations of the devices in accordance with the first embodiment present invention;

FIGS. 2b and 2c are a cross cut illustration of the devices in accordance with the first embodiment present invention;

DETAILED DESCRIPTION OF THE PREFERRED EMBODIMENTS

All methods known in the prior art claim the following desirable features:
- the use of a separator is not necessary
- contacts between the rolling parts of the same orbital row and, as a result, their counter friction are removed
- the use of rollers with several radii makes it possible to remove slippage and determine the rate of mutual rotation of parts that belong to different orbital rows. This rate can be related to parts' radii ratio and in this case the slippage is removed.
- the load is equally distributed over all rolling parts if the contact tightness is sufficient.
- all engaged surfaces are concentric.

All the above-mentioned devices can be viewed as one group of multi orbital devices (MOD). MOD are referred to as devices containing two races engaged by rolling parts with multi orbital positioning (MOP). These rolling parts are positioned between the races and are in contact with other rolling parts and/or engaged surfaces at three points (zones) each, excluding the contacts with rolling parts of the same row or next-to-neighbor rows. According to methods known in the prior art the tightness of contacts and concentricity of engaged races are determined by the variation of the size of rolling parts, which can be also related to as a change of the orbit lengths of their motion.

In devices based on this and similar methods the net load on their races is compensated by elastic deformation of parts. In accordance with these methods, this compensation should avoid eccentricity of the races.

This can be summarized as follows: this type of devices is based on the principle of creation and increasing the eccentricity of races. The resistance to elastic deformations of parts prevents increase of the eccentricity. The realization of this principle is depicted in FIGS. 1A and 1B.

Figure 1A:
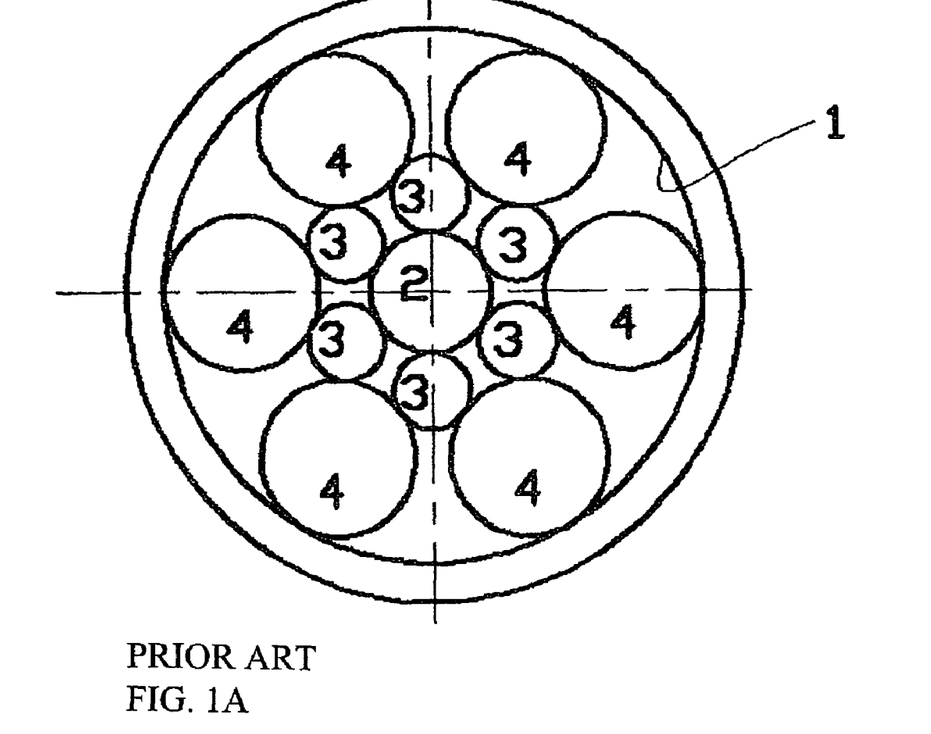
FIGS. 1A and 1B are illustrations of prior art devices.

FIG. 1A schematically illustrates an engagement of two concentric circular races by rolling parts placed in several orbital rows. This device consists of outer annular race 1, inner race 2, six rollers 3 in the inner row and six rollers 4 in the outer row. The device is slack-free, each roller 3 is in contact with inner race 2 and two rollers 4 of the adjacent row, simultaneously, each roller 4 is in contact with outer race 1 and two rollers 3 of the adjacent row. The geometric eccentricity of races 1 and 2 equals zero.

Figure 1B:
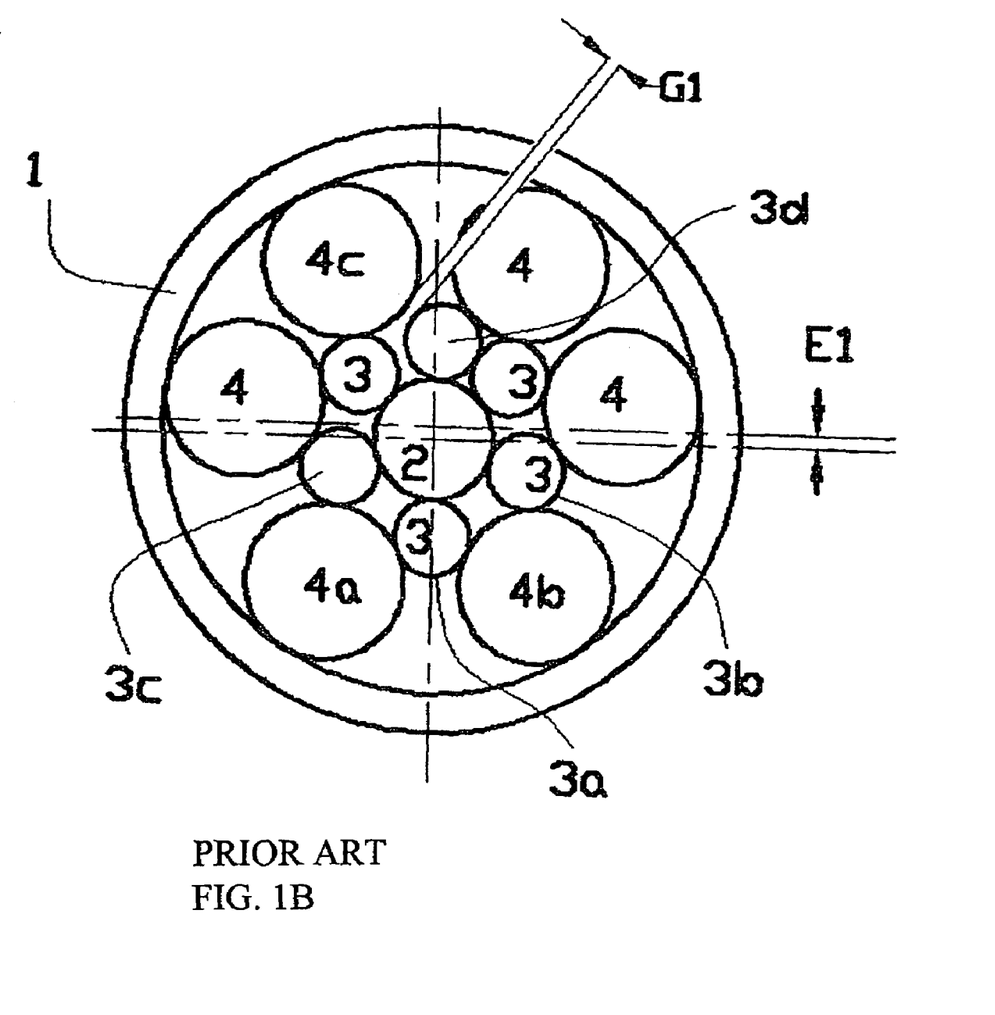

According to FIG. 1B, a displacement of inner race 2 results in finite eccentricity E1, which leads to a possibility that parts 3 and 4 will be rearranged such that roller 3a moves neighbor rollers 4a and 4b to different directions, and they in their turn move rollers 3a and 3c and so on. However, these displacements are insufficient to remove slack G1 between rollers 3d and 4c.

The position of rollers 3d and 4c becomes ill-defined, their loose contact with some of the other parts and roller 3d and can be in contact with a roller of the same row. As a result, the necessary system arrangement is violated.

It is clearly seen from the FIG. 1B that inner race 2 can be easily displaced in any direction from the position of concentricity of races 1 and 2 resulting in a loss of slackness.

From stated above it is clear that in a slack-free multi orbital engagement MOD, orbital concentricity OC is unstable. Therefore, all the analogues known in the prior art cannot be realized in real working devices and thus be compared to the present patent.

The primary patent search did not reveal any working analogues containing only races and free rolling parts without counter kinetic friction.

Finally, U.S. Pat. No. 1,737,695 can be considered as one more argument proving that methods known in the prior art are inconsistent. This patent is closely related to all others discussed by the author. The device disclosed in this patent contains two bearings, their mounted only to ensure the concentricity of the races. The said device is not operational without these two bearings.

The closest working analogue is the conventional roller bearing consisting of one row of rollers and a separator between rollers. This conventional roller bearing cannot be considered as prototype to the device disclosed in the present patent. The arguments supporting this point are discussed below. In a conventional roller bearing, there is kinetic friction of rolling parts with the separator and the surface of tracks. This kinetic friction is partially caused by a difference in the length of tracks.

When the bearing is loaded, the load is concentrated on limited track surface and cyclically changing one or two rolling parts. Because of slacks between the rollers and tracks, race eccentricity is inevitable.

The conventional roller bearing is based on the principle of preventing creation and increase of race eccentricity by cyclically changing one or two rolling parts.

The present invention discloses a method of engagement by free rolling parts and devices based on this method. The principle features of this method are as follows:
- engagement load is equally distributed over all rolling parts, improving load capability, resistance to wear, durability and free-running properties as well as making it possible to use less durable and expensive materials;
- adjustment of desirable gear ratio between parts in contact is done by ratio of parts' radii according to a specific implementation of the engagement (e.g. roller bearing or reduction gear);
- flexibility of the method with respect to deviation from nominal geometrical forms and sizes of the engagement parts;
- utilization of engagement for non-conventional realizations, i.e. differential reduction gears, pumps, roller bearings etc.;
- the method envisages a relatively simple design and assembly, and reduces costs;

The method presented in this patent is schematically depicted in FIG. 1C-7.

Figure 1C:
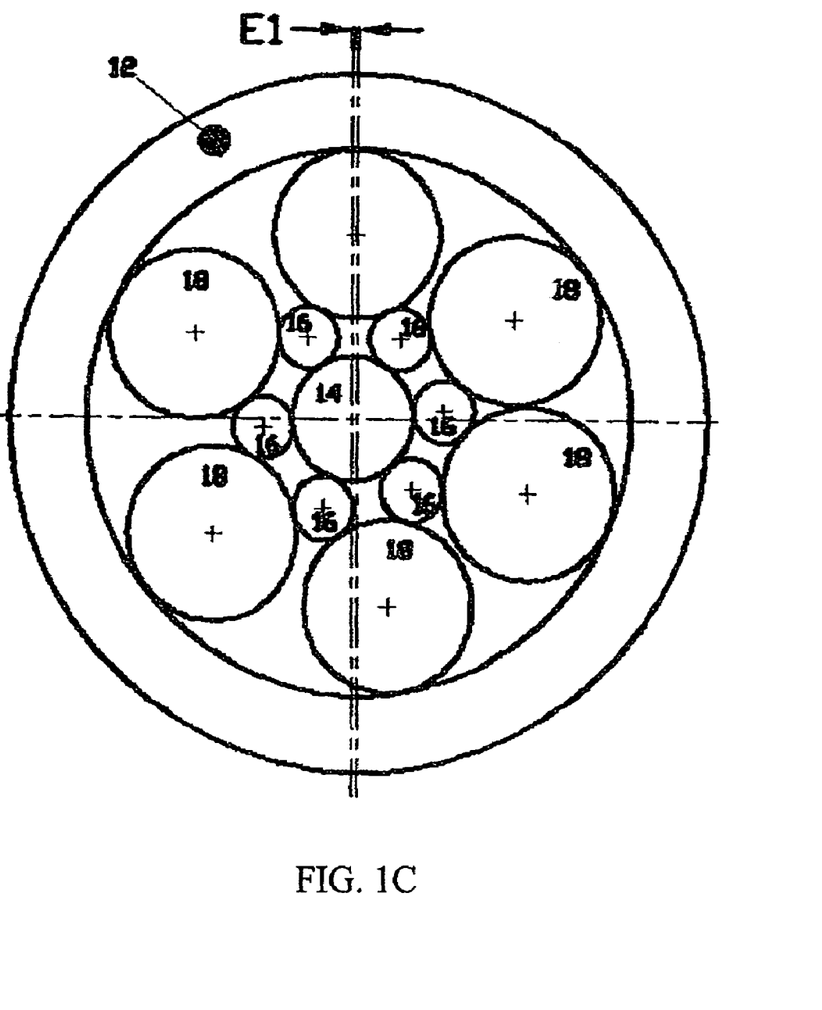

FIG. 1C illustrates an engagement of two eccentric circular races by several rows of rolling parts. This device contains outer annular race 12, inner race 14, rolling parts 16 of the inner row and rolling parts 18 of the outer row. The device is slack-free and each rolling part 16 is in contact with inner race 14 and rolling parts 18 of the adjacent row, rolling part 18 is in contact with outer race 12 and rolling parts 16 of the adjacent row. The orbital eccentricity OE of races 12 and 14 equals E1.

Figure 1D:
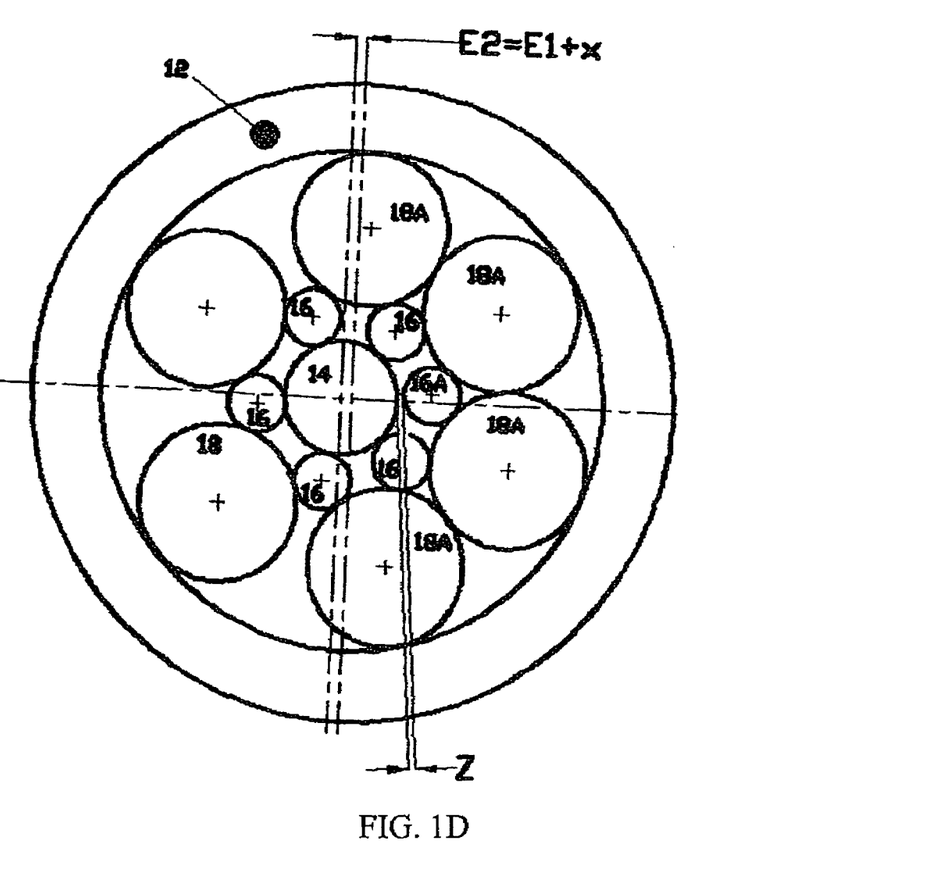

According to the present method, the devices MOD (see FIG. 1C) are mounted as shown in FIG. 1D where rolling parts 16 and 18 are positioned between races with arbitrary eccentricity E2=E1+X. The position of the rolling parts satisfies all conditions of MOP except the slackness condition Z=0. After the rolling parts being mounted, the races are moved in such a way that all the parts are in contact without slack and the finite value (see FIG. 1C) of eccentricity E1=OE is achieved. The finite value of the eccentricity is determined by sizes of the parts, number of rows and rolling parts in each row.

According to the present method depicted on FIG. 1C, the load on the races, directed to reduce the eccentricity E1, is distributed over all contact surface and causes retention of parts. This makes it impossible to decrease OE=E1 below the limits of elastic deformation of real parts. The load distribution over all parts reduces a load apiece and, therefore, the elastic deformations of parts are less than conventional ones.

From these descriptions it is clearly seen that for slack-free engagement of not concentric races based on MOP of free rolling parts, decrease of race eccentricity causes a part retention with equally distributed load over all contact points (zones) of the device.

This spatial phenomenon is not known in the prior art, the efficient use of the phenomenon is the principle argument of the present patent.

The above-mentioned spatial phenomenon allows to space rolling parts of MOP without slacks between eccentric engaged races. This prevents further decrease of race eccentricity beyond the limits of parts elastic deformations because of their mutual retention.

For non-circular races there is such an arrangement of MOP that the engagement is slack free. Any violation or deflection in any direction from the said arrangement leads to breakdown of necessary mutual positioning of the engagement parts and slack occurs. This kind of arrangement can be related to as an orbital concentricity (OC). In the case of circular races OC corresponds to geometrical concentricity. The orbital eccentricity (OE) is introduced to denote the deflection from the orbital concentricity OC.

Therefore, it is more efficient to use devices based on this principle where all the parts prevent decrease of eccentricity rather then conventional devices where only one or two rolling parts prevent formation and increase of eccentricity.

In accordance to the method presented in this patent and shown on FIG. 1C, the arrangement of engagement parts is slack-free and ensures a relative rotation of races with all the parts participating in the rotation and the orbital rotation of the rolling parts system. The operation of the said engagement is guaranteed by a stabilizing radial load, which decreases eccentricity E1=OE. The stabilizing radial load is distributed over all of the rolling parts and contact surfaces of races resulting in elastic deformations of parts, resistance to which neutralizes the force of the applied load.

Elastic deformations of parts lead to some decrease of eccentricity E1=OE to its working value E1−Y=OE−Y. This working value is further referred to as working orbital eccentricity (WOE) of MOD. During the operation of the device, the size and shapes of the parts are changing due to the wear and therefore WOE is decreasing. A certain value of WOE takes the device to be out of order. The situation becomes critical when the parts are elastically deformed due to such a wear that some critical value of WOE (CWOE), determined for a specific device, is not guaranteed.

The durability and operational time of a specific device can be predetermined by setting the value of initial WOE depending on the quality of materials, design, operational mode of the device.

In the devices based on the principle of prevention of WOE decrease, the significant reduction of the applied load on each part decreases the wear of the parts during the operation of the device.

This type of devices is much more wear-resistant than devices based on conventional principle of prevention of WOE. The wear-resistance and durability of devices, based on prevention of WOE decrease, is the most of cases proportional to a number of rolling parts in each orbital row.

Changes in mutual position of MOD parts, caused by wear, are significantly reduced in comparison with devices based on conventional techniques.

Another significant advantage of MOD is slack self-compensation of the engagement with any applied load in contrast to conventional devices, which do not operate without slacks.

For proper MOD operation, the engagement is mounted in such a way that the force of the applied load, sufficient for system stabilization, is directed in such a way that OE decrease occurs. This can be reached by several methods known in the prior art, e.g. the inner race axis is fixed in a massive housing (not shown) and, simultaneously, the axis of one of the rolling parts is fixed by auxiliary bearing (not shown).

In this case MOD operates as a vehicle wheel, its outer race rolls on abutment surface with a load being applied to the inner race is compensated by parts of the device, which are resistant to elastic deformations.

It is possible to utilize the variations of OE with load being applied, e.g. a wheel rolls on a ditch on the road. For the wheel drive it is possible to use a rotating drive of the inner race of the wheel or at least one of the rolling parts. This provides a reducing drive of the outer race-wheel.

In this case of the wheel rolling on a ditch, the zero applied load stops the wheel drive. This makes unnecessary the lock of driving wheels of vehicles, which are not able to pass turns and rough intervals of road on high speed.

It is clear that the above-mentioned example is a differential orbital reduction gear with three driving elements: two races and orbital system of rolling parts.

Moreover, each rolling parts can be used as a driving shaft that moves on the engagement orbit. Combination of varying sizes of parts, their number in a row and number of rows provide a wide range of gear ratios and makes it possible to combine directions of rotation of races and rolling parts, as well as, to control the gear ratio between any driving parts.

A sufficient number of rolling parts in each row allows to transfer, entirely by friction, moments much bigger than in tooth engagements. This also allows a control of stabilizing load, which determines retention of parts. The retention of parts is minimal for zero transferred moments and reaches its biggest value for maximal transferred moments without slippage of parts. This MOD can be implemented as a clutch mechanism.

Using stepped rolling parts, it is possible to vary widely gear ratios between rolling parts of different orbital rows, providing a gear ratio of rolling parts equal to the ratio of races radii. This helps to reduce friction between the rolling parts and tracks, caused by the length difference of races tracks in conventional devices.

When OE is fixed, the tightness of contact of parts is automatically maintained by causing deflection of rolling parts axes from being orthogonal to meredian planes.

To ensures this, the opposite ends of the rolling parts with different radii are used as surfaces being in contact with other parts. In this case the orbital motion of the rolling parts engaged with other parts is possible only in the meridian plane and with the same orbital speed. The rolling parts roll on the engaged surface only if the slippage and friction exist. The difference of the friction forces on opposite sides results in the deflection of axes of the rolling parts from being orthogonal to the meridian plane. The deflection leads to the balls being pulled out of the engagement and retention is automatically conserved even in the case of substantial wear of the parts. The variation of the part shapes in the design can predetermine the retention according to the specific characteristics of the device.

Figure 2A:
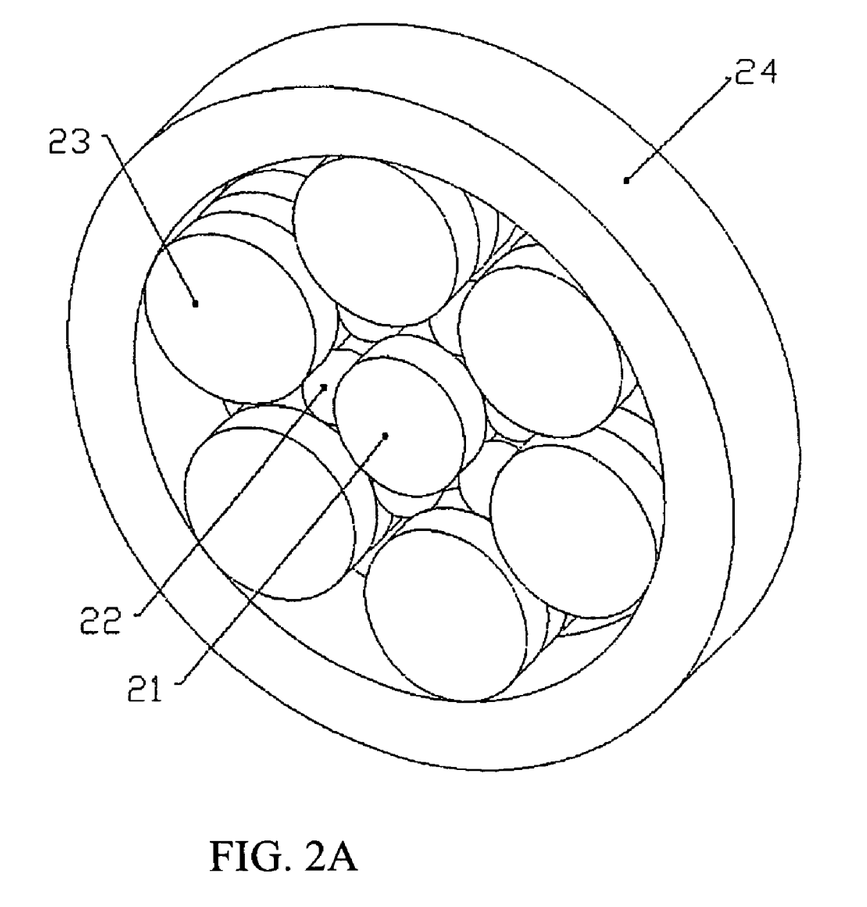
FIG. 2a is a perspective view of the devices in accordance with the first embodiment present invention.
Figures 2B, 2C:
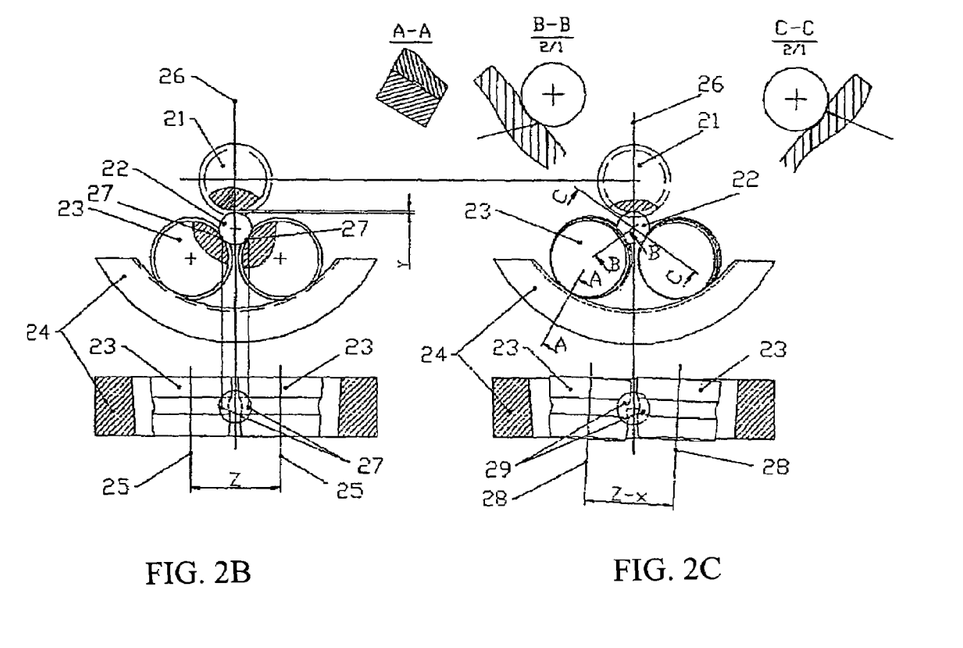

This is depicted in FIGS. 2A, 2B and 2C.

MOD on FIGS. 2A, 2B and 2C includes shaft 21 with annular groove, orbital row of balls 22 on the groove, conical rollers 23 spaced between balls and mounted in such a way that their conically grooved surface are in contact with balls 22, race 24 adjacent to rollers 23. The orbital eccentricity is constant and fixed by auxiliary supports (not shown) that keeps the position of shaft 21 and race 24 unchanged.

The rolling of balls 22 and rollers 23 even with a slack between some of them and shaft 21 or race 24 removes the slacks of some of the balls and rollers due to their weight and centrifugal forces. This makes frictional forces to cause the balls and rollers to roll on the contact parts. The conical rollers 23 roll on conical surface of race 24 with different orbital translation speed of their ends.

FIG. 2B illustrates initial position of rollers 23 with no steady contacts and retention. Their axes 25 are parallel to axis 26 of shaft 21 and race 24 and spaced at distance Z from each other. The balls 22 are in contact with rollers 23 in points 27. This does not ensure contact of balls 22 with shaft 21 if rollers 23 are in contact with race 24. The slack Y between balls 22 and shaft 21 is clearly seen in the figure. Rotation of shaft 21 changes the position of all parts to that shown on FIG. 2C. In accordance with FIG. 2C the rolling of balls and rollers makes all of them to be in contact with adjacent parts and leads to rolling of the whole system.

Because of different planetary speed of different ends of rollers 23, rolling deflects axes 25 of rollers 23 to position 28 leading to decrease of a distance between axes to value Z-x and displacement of contact points of roller 23 and balls 22 to position 29. These deflections and displacements pull out balls 22 from the space between rollers 23 to track 21.

This type of engagement is stable with at least one part rotating and provides retention of parts. The retention is determined by obliquity of parts and operational speed of the engagement.

In this case a stabilizing force is not necessary for a proper functioning of MOD system.

If the rotation ceases the rolling parts remain tightly positioned and the engagement is ready to operate after a single start.

It is clear that even in the case of substantial wear the slackness of the engagement is conserved as well as deflection of axes of roller 23 from being orthogonal to the meridian plane increases. This deflection is cause and effect of their slippage and friction, which provides the retention of the engagement determined by the obliquity angle of parts and operational speed of the device.

Such an efficient utilization of friction is an additional advantage of multi orbital devices based on the above-mentioned principle.

Figure 3A:
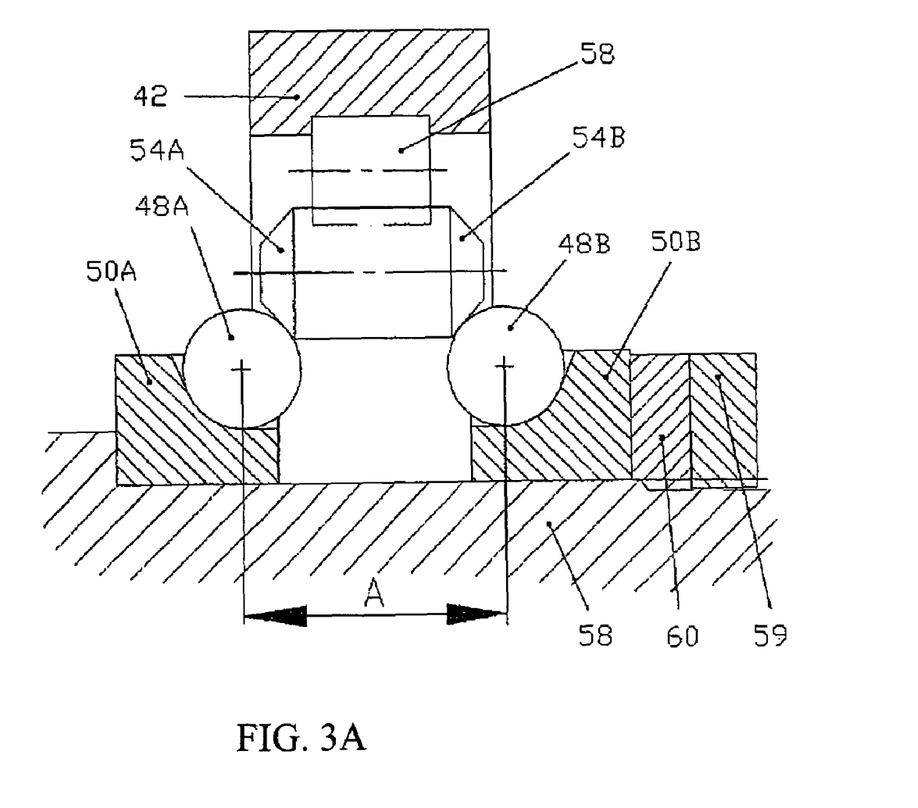
FIG. 3A is cross cut illustration of the devices in accordance with the second embodiment present invention.
Figure 3B:
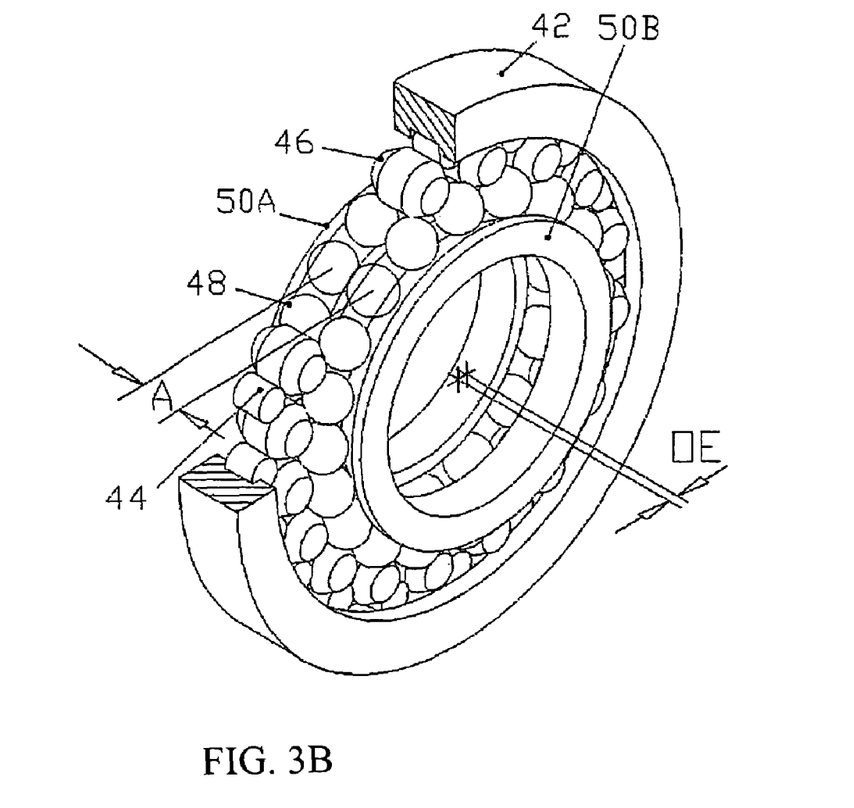
FIG. 3B is a perspective illustration of the devices in accordance with the second embodiment present invention.

Another method of control of contact tightness and other version of MOD are shown on FIGS. 3A and 3B. MOD contains outer race 42, inner race 50 divided into two symmetrical parts and adjacent to them rolling parts 44, 46, and 48. Rolling parts 48 are placed into two rows 48A and 48B identical in a kinematical sense. Two symmetrical parts have concave tracks engaged by balls 48 (A and B). Rollers 46 of the central row have conical surfaces 54A and 54B, which in the contact with balls 48 (A and B), as well as, a central cylindrical surface, which is in contact with surface 58 of cylindrical rollers 46. Rollers 46 are in contact with track of outer race 42. Races 50 (A and B) and shaft 58 are concentric. Shaft 58 and races 42 have eccentricity OE between their axes, which fixed by auxiliary supports. The mutual axial position of two symmetrical parts of inner race 48 (A and B) is controlled by nut 59 on shaft 58 and adjusting ring with spring 60.

The value of A is adjusted by nut 59 to achieve the desired retention. This allows to vary the tightness of contacts limiting the value of maximal possible moment applied to the device. If the maximal moment is reached, slippage occurs.

The device is durable and has a long lasting performance even in the case substantial wear of parts with a value of OE kept unchanged.

Active control of value of eccentricity OE can be performed if required. This is possible because the motion of auxiliary supports (not shown) of shaft and outer race can be controllable.

The method presented in this patent can be implemented in self-stabilizing anti-frictional slack-free reduction gear-bearing. To achieve this a number of MOD are mounted together in one device or positioned in a parallel manner in such a way, that their OE have different directions, e.g. 120 degrees with respect to each other.

In this type of MOD a load applied in any direction causes decrease of OE of one or two engaged MODs.

For example, one of the races is extended and taken common for the set of parallel MODs, and pair races are being mounted separately or within one part. In this case different direction of OE is ensured concentric races tracks of composite device or by eccentric races, which is mounted rotated with respect to each other and engaged with the race of the composite device. It is also possible to combine them for strengthening MOD to loads of known direction. This combination can be performed for MODs with different load capability.

Figure 4A:
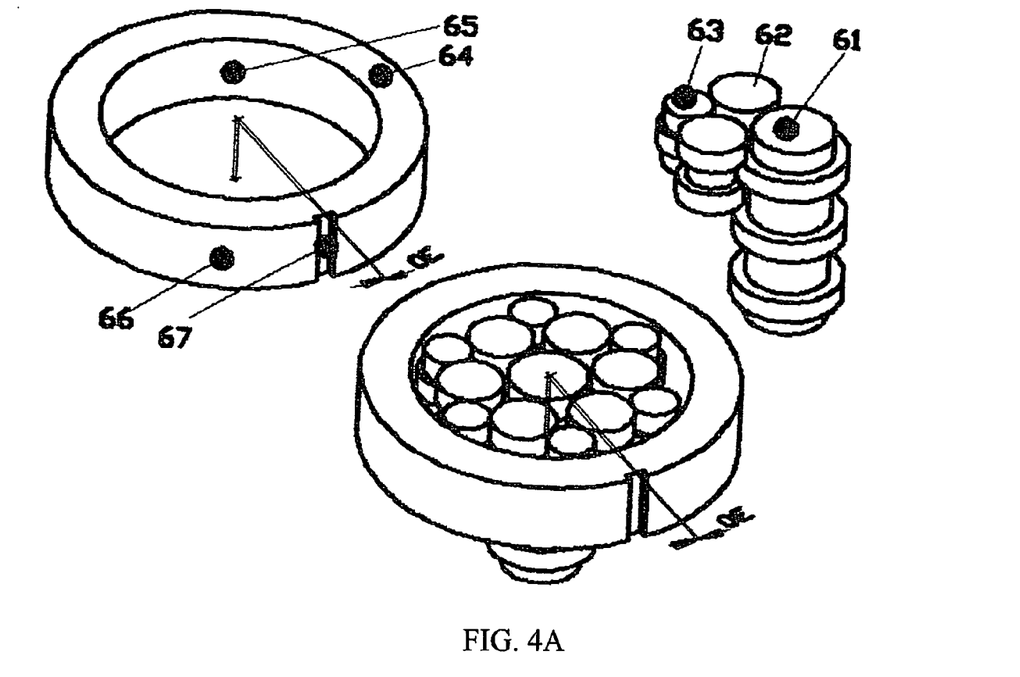
FIG. 4A is a perspective illustration of the devices in accordance with the third embodiment present invention.
Figure 4B:
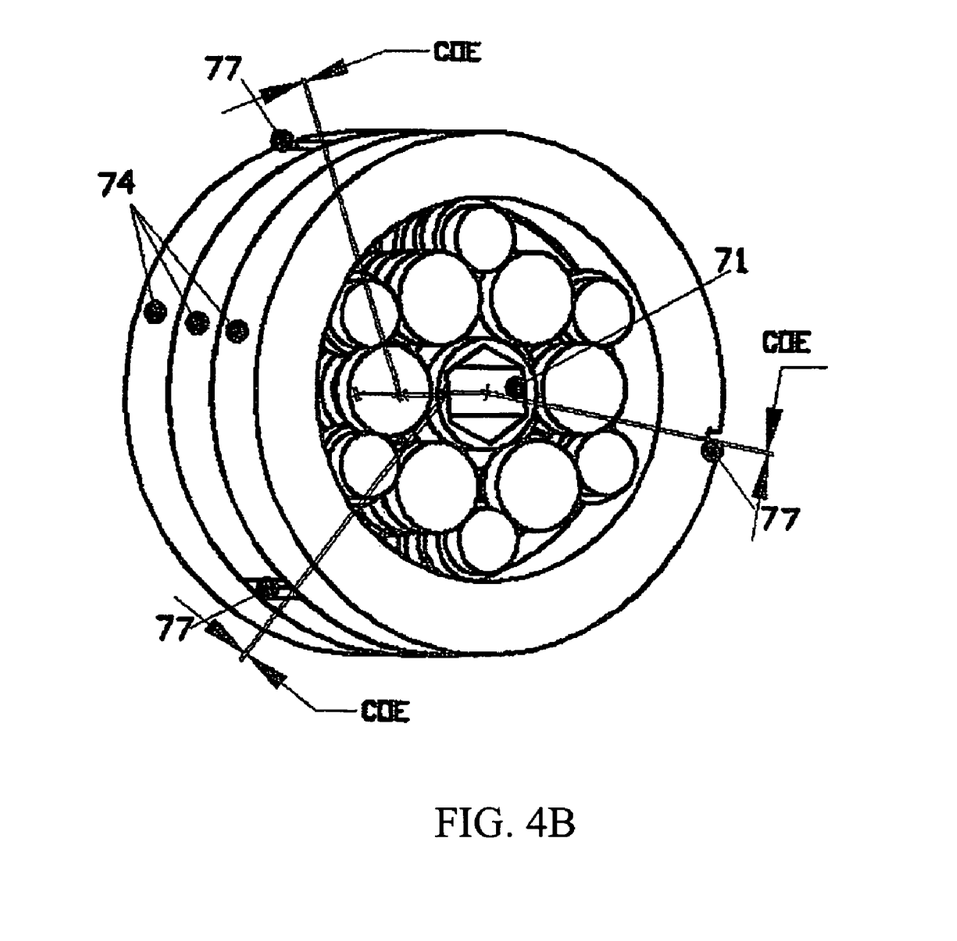
FIG. 4B is an exploded view of the devices in accordance with the third embodiment present invention.

FIGS. 4A an 4B depict an example of a composite reduction gear-bearing, which contains shaft 61 with concentric tracks, race 64 and stepped rollers 62 and 63. Track 65 of race 64 is eccentric to mounting surface 66 by value OE. A fixing element is performed on mounting surface 66, e.g. dowel groove 67 being engraved on mounting surface 66.

The fixing element allows fixing angular position of mounted race 66.

The tightness of contacts in MOD is adjusted by sizes of parts as well as known methods of adjustment of bearings, e.g. by obliquity of surface 66 and depth of its mount in conical mounting opening.

FIG. 4B illustrates a composite MOD being combined of three MOD shown in FIG. 4A. The direction of OE of races 74 is rotated by 120 degrees with respect to each other, this is possible due to dowel grooves 77. Shaft 71 has a cut opening for a rotating drive.

Figure 5:
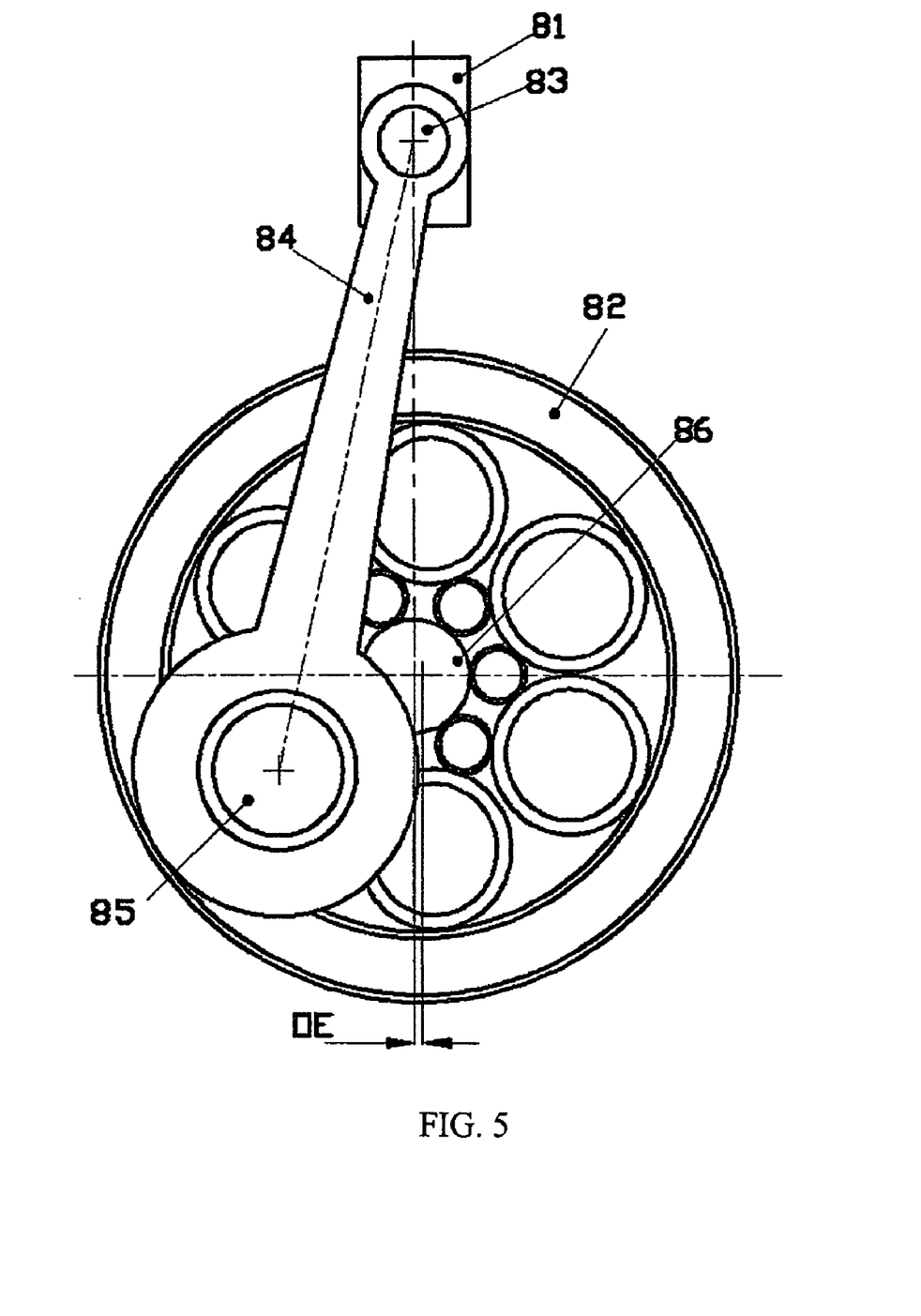
FIG. 5 is an illustration of a crank mechanism implementing the devices in accordance with the third embodiment present invention.

In FIG. 5 shows MOD being implemented in crank mechanism for linear motion, back and forth, of piston 81 to be transferred to circular motion of race 82 and vice versa.

Piston 81 is restricted to linear motion, which is transferred by finger 83 to rod 84. Rod 84 is rotationally engaged with one of rolling parts 85 of MOP. This part should be sufficiently lengthened. The load force stabilizing MOD is adjusted to decrease OE for the device starting to operate or to increase of OE for stopping the device.

During the operation, the translation of piston 81 by rod 84 and rolling part 85 engaged with it, forces the rolling parts of MOP to roll orbitally, e.g. on a stationary rod 86, fixed in housing (not shown) and outer race 82.

In this case, gear ratio of MOP makes it possible to have a desirable deflection angle of rotation of race 82 after one cycle of piston 81. The rotation of race 82 is transferred to consumer.

A parallel engagement of several MOD of this type, having common transmission, allows transmission drive by a combination of independent MOD even in the case of a single of these MOD. This is ensured by taking out of operation some MODs, when OE is increased. Race 82 of the not operating MODs rotates freely being engaged with transmission, and rolling parts, rod 84 and piston 81 are halted.

The said implementation of MOD in engines makes it possible to use this type of reduction gears instead of toothed, hydraulic and other conventional reduction gears with several gear ratios The necessary transferred moments can be provided by a combination of operating MODs preventing not operating MODs from wear and fuel consumption.

Another novelty feature of this type of MOD system is the exceptional durability because it operates even in the case of damage of some MODs combined in it. The damaged MODs or their parts can be easily replaced independently of other MOD. This can be crucial factor under some circumstances.

Furthermore, the resulting moment and fuel consumption of the engine can be improved by proper adjusting some system parameters, e.g. orbital speed, distance between parts and length of crank arm and other parameters. This can be reached by adjusting angle between OE and a direction of stabilizing load force.

All the said above is applicable to a pump based on the same principle.

Figures 6A, 6B:
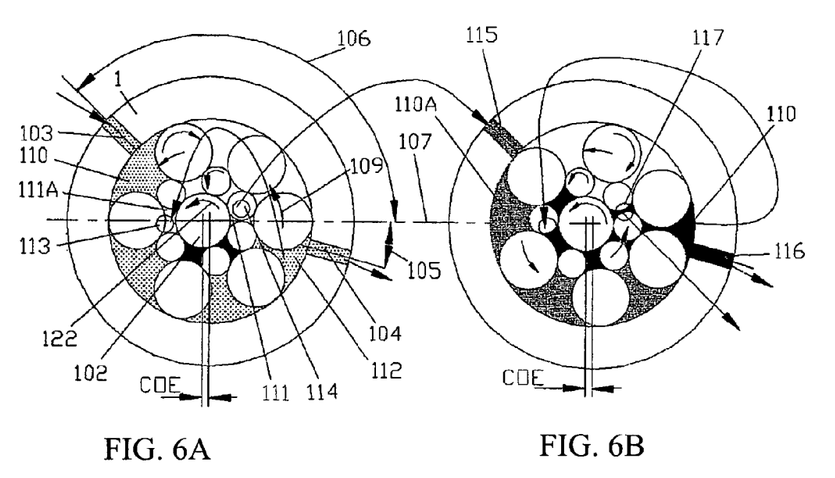
FIGS. 6A and 6B perspective illustration of the devices in accordance with the third embodiment present invention.

FIGS. 6A and 6B depict a possible implementation of MOD as an extrusion pump or gas-liquid engine.

The device shown on the figures contains stationary race 101 and driving shaft 102 engaged by MOD of rolling parts. Races 101 and shaft 102 have distance WOE between them, this is reached by some mechanisms not shown in the figures. Race 101 has radial openings 103 and 104, positioned at necessary angles 105 and 106 to axis 107 of direction of OE.

The rotation of shaft 2 in the direction indicated by arrow 22 leads to the rolling of MOP system in the direction indicated by arrow 9 with a speed determined by the kinematics of the engagement. In the example of two orbital MODs shown on the figures, the rotation speed of MOP system of rolling parts is much bigger than that of shaft 102.

During the rotation, the distances between adjacent rolling parts of the same orbital row and area of fields 110 and 111 change.

Area of fields 110-110A and 111-111A reach its maximal and minimal values at opposite sides with respect to shaft 102. Fields 110-110A and 111-111A are isolated by loaded rolling parts and identical in each orbital row. The cyclic change of area of the fields is determined by sizes of parts and value of OE. This makes it possible to vary the change with accordance to specific needs. The control of phase characteristics is ensured by positioning valve channels 103, 104, 113, 114 with necessary angles 105 and 106 with respect to axis 107 of OE direction.

With tight attachment of valve washers (not shown) on sides of the engagement, closed volumes between rolling part of each row are formed. These volumes change during the operation and can used as working chambers of pumps or engines.

For example, a liquid or gas enters working chamber 110 through channel 103 of race 101 and fills space 110 of working chamber between rolling parts of corresponding orbital row. The liquid or gas is compressed to smaller volume in position 112 during the orbital motion of chamber 110. After being compressed the liquid or gas exits through valve channel 104 and can be directed for additional compression to into chamber 111A and, finally, after the second compression is directed to a consumer through valve channel 114.

Another MOD can be a consumer receiving the compressed liquid or gas and compressing it further up to a desirable state, e.g. a liquid or gas is directed from channel 114 to channel 115 (see FIG. 6B) and flows out at different pressures from channel 116 and 117.

This type of pumps can be used for as dosing mixers, which has channels of different rows carrying different components mixed together at the exit with high precision of mixing ratio.

In spite of small OE necessary for maximal reduction of friction in the device and undesirable for a good rate of compression, the high pump efficiency can be provided increasing number of orbital rows, rolling parts in each row and high rotation speed of the device.

After completing first cycle in one row it is also possible to process liquid or gas in chambers of adjacent rows up to the last row, furthermore, it can be processed in other attached MOD.

Because of high retention of parts in the engagement, the chambers are highly hermetic. If the change of volume of liquid or gas is not required, the said device can be used as a bi-directional pump cable to produce high working pressure and control output without changing the pressure.

The said device can be also used as a pressure or volume engine.

Pump or engine presented in this invention is of very simple design that guarantees long lasting performance without leak. It can be produced of non-metallic materials, including molten polymers, and replace pumps for almost all traditional applications, as well as, various types of engines. All this can be done using one standard device by varying the way of its connection.

Figure 7:
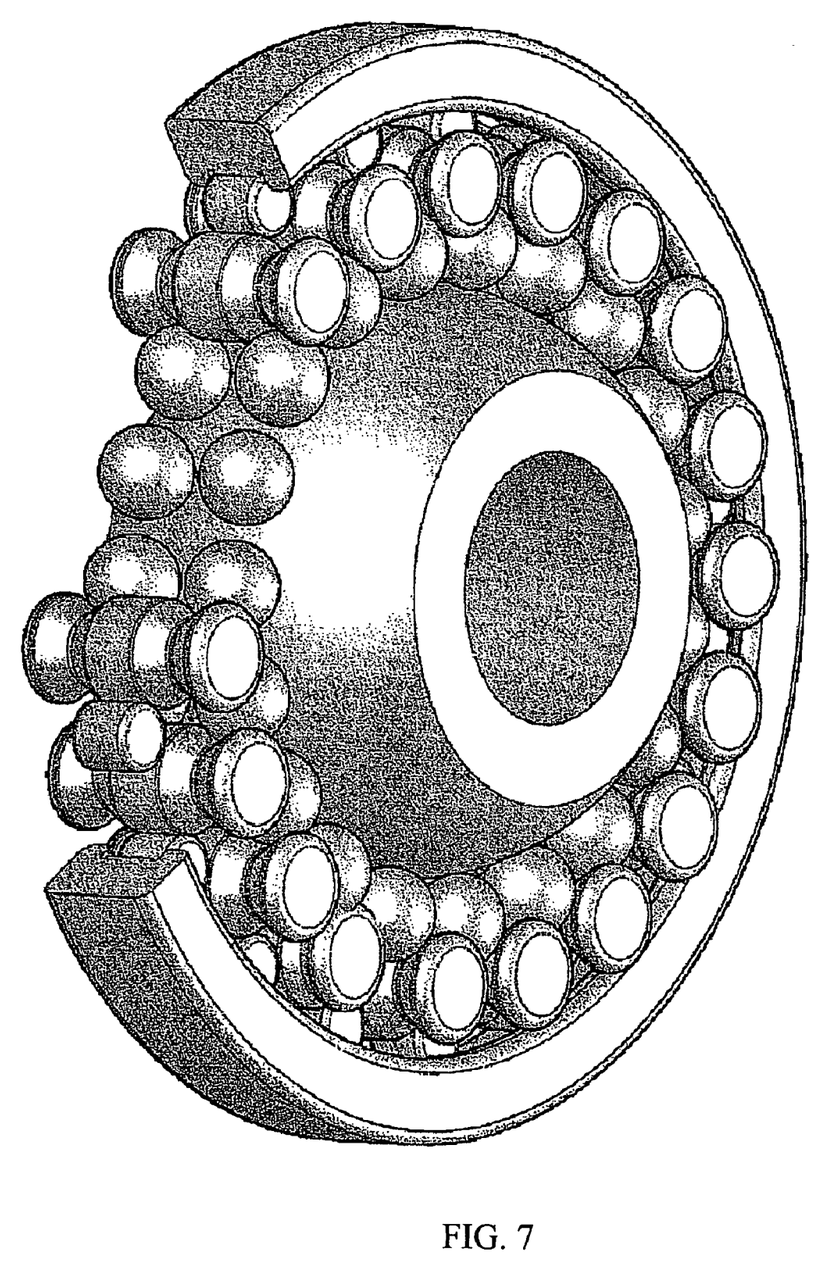
FIG. 7 is an illustration of a crank mechanism implementing the devices in accordance with the fourth embodiment present invention.

FIG. 7 depicts the implementation of the said method in spherical bearing-reduction gear where OE of the spherical race with respect to the outer race is ensured by known in the prior art methods (not shown), e.g. the position of shaft (not shown) of the spherical race is fixed, as well as, a direction of OE of the outer race, with the load reducing OE being applied to the outer race.

If retention of parts is present in the engagement, the balls engaged with pairs of annular grooves on the rollers of the central orbital row are unable to be pulled out of the engagement. This ensures proper operation of the device as mentioned above.

While the above description contains many specifities, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

What is claimed is:

1. Roller device comprising:
   an outer race (12),
   an inner race (14),
   said outer race and said inner race being mutually rotable,
   at least two rows of first and second free rotable rolling parts (16), (18),
   disposed between said outer race (12) and said inner race (14),
   said first free rotable rolling parts (16) are disposed around said inner race (14) and being in engagement with said inner race (14), said second free rotable rolling parts (18) are disposed between said outer race (12) and said first rolling parts (16) and being in engagement with said outer race (12) and with said first free rotable rolling parts (16), in which said outer race (12) and said inner race (14) are disposed with eccentricity and said outer race (12) and said inner race (14) being mutually movable in direction providing the variation of said eccentricity for attainment slack-free engagement between said races and said free rotable rolling parts and between said first and second free rotable rolling parts.

2. Roller device according to claim 1, wherein said rolling parts are stepped.

3. Roller device according to claim 1, wherein at least one of said races has spherical track.

4. Roller device according to claim 1, wherein at least one of said rolling parts has different radii of contact points at opposite ends.

5. The roller device according to claim 1, implemented as a bearing.

6. The roller device according to claim 5, further comprising a rod, wherein one of the free rotable rolling parts is rotationally engaged with said rod.

7. The roller device according to claim 1, implemented as a clutch.

8. The roller device according to claim 1, implemented as a pump.

9. The roller device according to claim 1, implemented as an engine.

10. The roller device according to claim 1, implemented as a unit of a gearing.

* * * * *